(12) United States Patent
Delgado et al.

(10) Patent No.: US 11,840,160 B1
(45) Date of Patent: Dec. 12, 2023

(54) AUTOMATICALLY ADJUSTING ERGONOMIC FEATURES OF A VEHICLE SEAT

(71) Applicant: GHOST AUTONOMY INC., Mountain View, CA (US)

(72) Inventors: Mario Delgado, San Francisco, CA (US); Volkmar Uhlig, Cupertino, CA (US); Par Botes, Atherton, CA (US); John Hayes, Mountain View, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

(21) Appl. No.: 17/866,279

(22) Filed: Jul. 15, 2022

(51) Int. Cl.
*B60N 2/02* (2006.01)

(52) U.S. Cl.
CPC .... *B60N 2/0248* (2013.01); *B60N 2002/0268* (2013.01)

(58) Field of Classification Search
CPC ................. B60N 2/0248; B60N 2002/0268
See application file for complete search history.

(56) References Cited

U.S. PATENT DOCUMENTS

| | | | |
|---|---|---|---|
| 10,850,709 B1 * | 12/2020 | Nagata | G07C 9/00563 |
| 2014/0052345 A1 * | 2/2014 | Tobin | B60R 16/037 |
| | | | 701/49 |
| 2017/0284819 A1 * | 10/2017 | Donnelly | G06Q 50/30 |
| 2018/0244285 A1 * | 8/2018 | Stevens | B60N 2/0224 |
| 2021/0229601 A1 * | 7/2021 | Hu | B60R 1/12 |

* cited by examiner

*Primary Examiner* — Abby Y Lin
*Assistant Examiner* — Renee LaRose

(57) ABSTRACT

Automatically adjusting ergonomic factors of a vehicle seat, including: receiving first video data capturing a person outside of a vehicle; identifying, based on the first video data, one or more physical attributes of the person; and modifying vehicle seat configuration based on the one or more physical attributes.

20 Claims, 13 Drawing Sheets

AUTOMATICALLY ADJUSTING ERGONOMIC FEATURES OF A VEHICLE SEAT

BACKGROUND

Field of the Invention

The field of the invention is vehicle systems, or, more specifically, methods, apparatus, autonomous vehicles, and products for automatically adjusting ergonomic features of a vehicle seat.

Description of Related Art

Vehicles include adjustable seats that may be reconfigured to conform to the particular preferences of the occupant. Such reconfigurations are performed through manual adjustment by an occupant.

SUMMARY

Automatically adjusting ergonomic features of a vehicle seat may include receiving first video data capturing a person outside of a vehicle; identifying, based on the first video data, one or more physical attributes of the person; and modifying vehicle seat configuration based on the one or more physical attributes.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
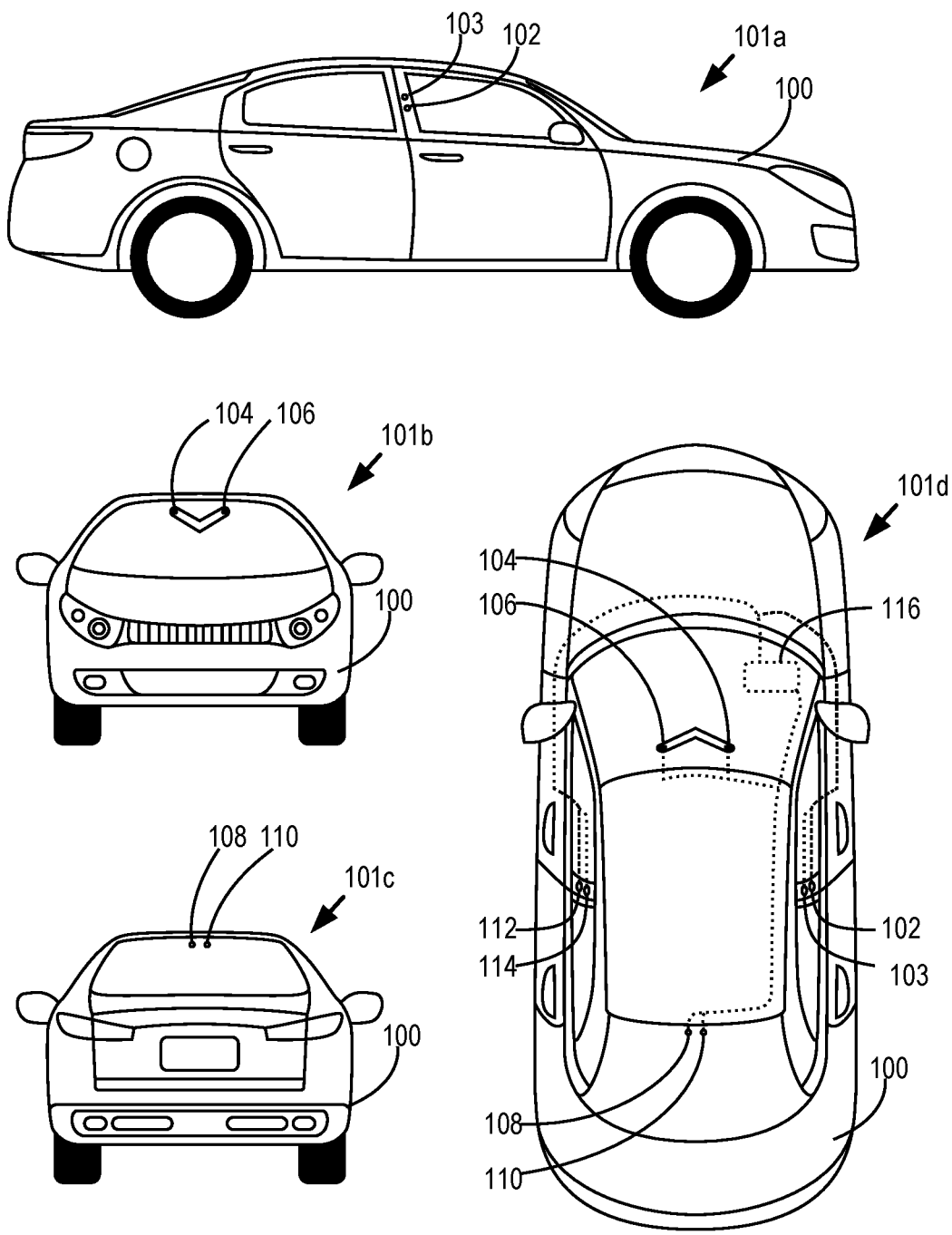
FIG. 1 shows example views of an autonomous vehicle for automatically adjusting ergonomic features of a vehicle seat according to some embodiments of the present disclosure according to some embodiments of the present disclosure.

Automatically adjusting ergonomic features of a vehicle seat may be implemented in an autonomous vehicle. Accordingly, FIG. 1 shows multiple views of an autonomous vehicle 100 configured for automatically adjusting ergonomic features of a vehicle seat according to embodiments of the present disclosure. Right side view 101a shows a right side of the autonomous vehicle 100. Shown in the right-side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for automatically adjusting ergonomic features of a vehicle seat may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Automatically adjusting ergonomic features of a vehicle seat in accordance with the present disclosure is generally implemented with computers, that is, with automated computing machinery. For further explanation, therefore, FIG. 2 sets forth a block diagram of automated computing machinery comprising an exemplary automation computing system 116 configured for automatically adjusting ergonomic features of a vehicle seat according to specific embodiments. The automation computing system 116 of FIG. 2 includes at least one computer Central Processing Unit (CPU) package 204 as well as random access memory 206 ('RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors. As described herein, cameras may include a solid state sensor 212 with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other commands. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116, the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or any combination of these). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to an execution environment 227. Such operations can include filtering, compression, encoding, decoding, or other operations. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. Each instance of virtual machine 229 may host the same operating system or one or more different operating systems. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation modules 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others. For example, the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Although the example included in the preceding paragraph relates to an embodiment where the autonomous vehicle 100 may be configured to execute a first operating system when the autonomous vehicle is in an autonomous (or partially autonomous) driving mode and the autonomous vehicle 100 may be configured to execute a second operating system when the autonomous vehicle is not in an autonomous (or partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. The time constraint may not necessarily be in real-time, but instead with the highest or one of the highest priorities so that operations indicated for a real-time modality are executed faster than operations without such a priority. For example, as the automation module 220 must make determinations as to operational commands to facilitate autonomous operation of a vehicle. Accordingly, the automation module 220 must make such determinations within one or more time constraints in order for autonomous operation to be performed in real-time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constraints, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
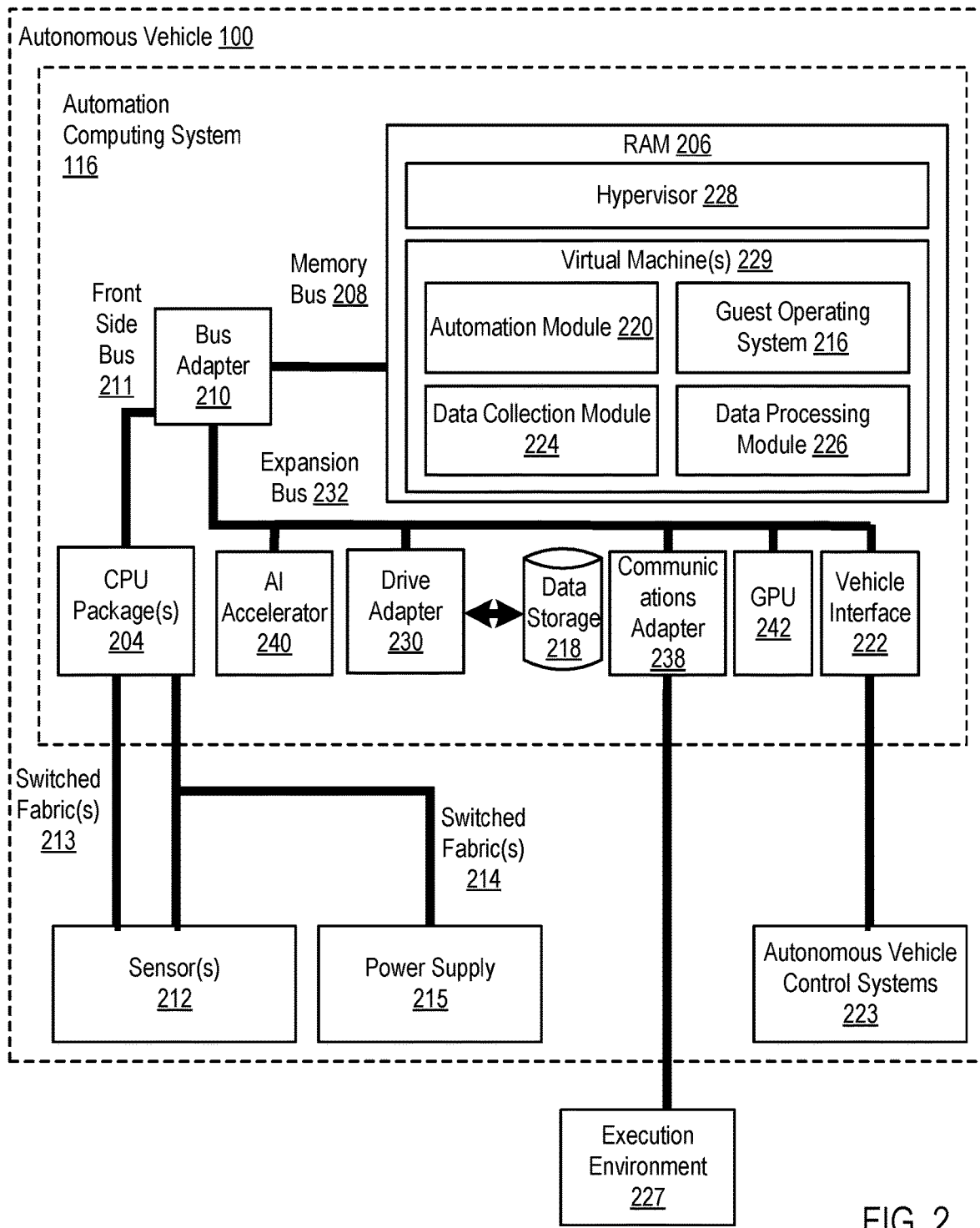
FIG. 2 is a block diagram of an autonomous computing system for automatically adjusting ergonomic features of a vehicle seat according to some embodiments of the present disclosure.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for automatically adjusting ergonomic features of a vehicle seat according to various embodiments include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for automatically adjusting ergonomic features of a vehicle seat according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
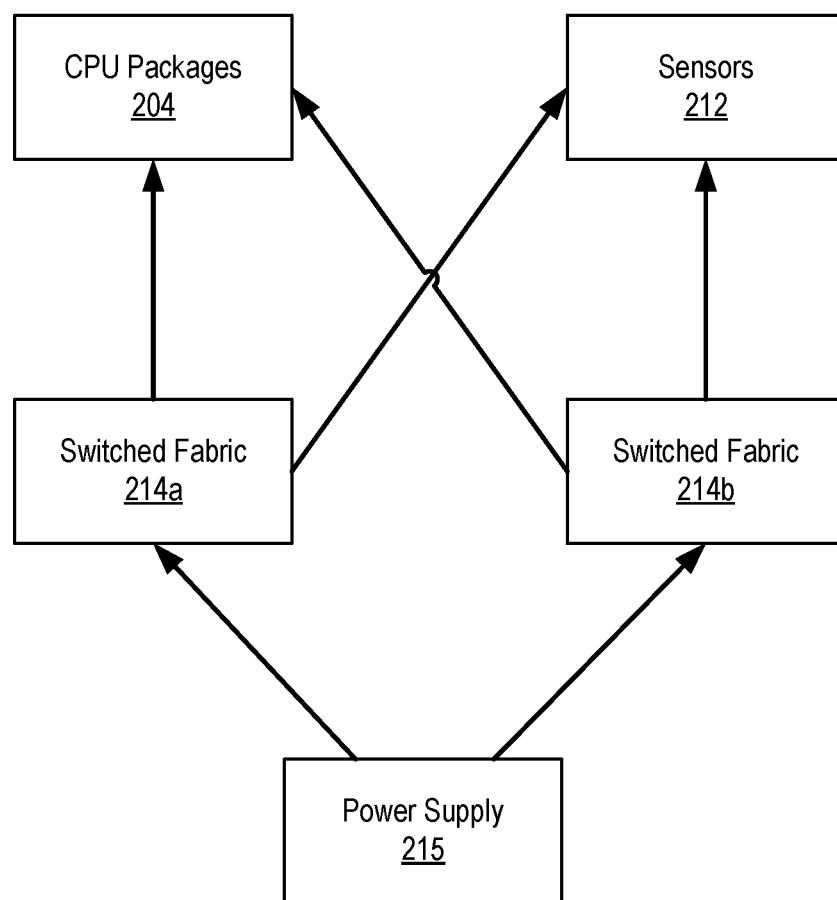
FIG. 3 is a block diagram of a redundant power fabric for automatically adjusting ergonomic features of a vehicle seat according to some embodiments of the present disclosure.

FIG. 3 shows an example redundant power fabric for automatically adjusting ergonomic features of a vehicle seat. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, the approach shown by FIG. 3 can be modified to include three, four, five, or more switched fabrics 214.

Figure 4:
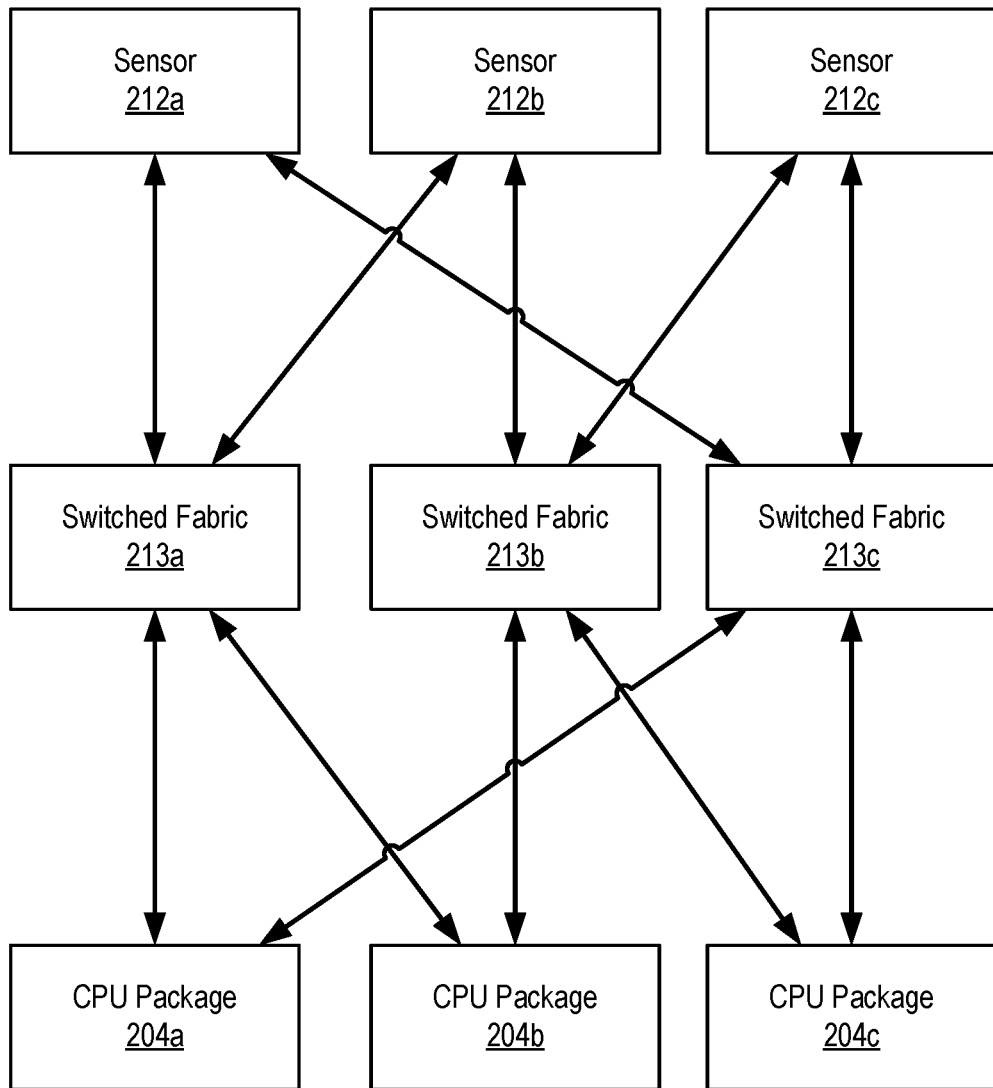
FIG. 4 is a block diagram of a redundant data fabric for automatically adjusting ergonomic features of a vehicle seat according to some embodiments of the present disclosure.

FIG. 4 is an example redundant data fabric for automatically adjusting ergonomic features of a vehicle seat. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy.

Figure 5:
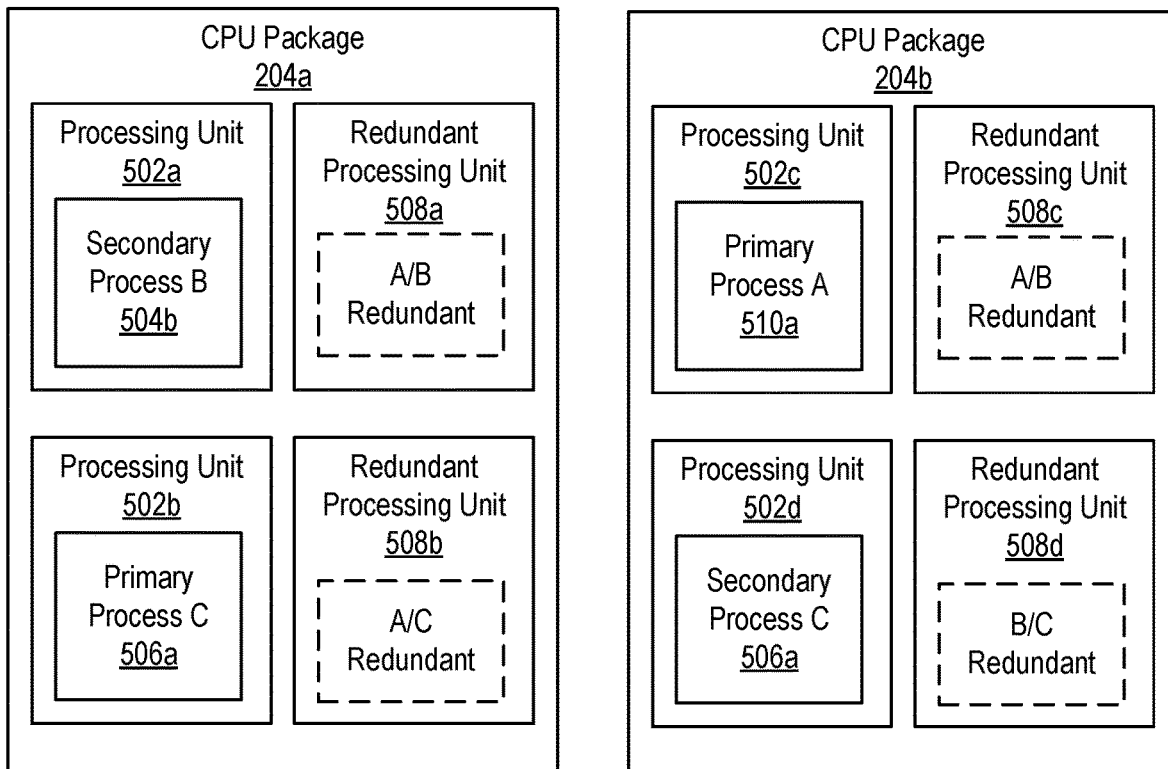
FIG. 5 is an example view of process allocation across CPU packages for automatically adjusting ergonomic features of a vehicle seat according to some embodiments of the present disclosure.
Figure 5:
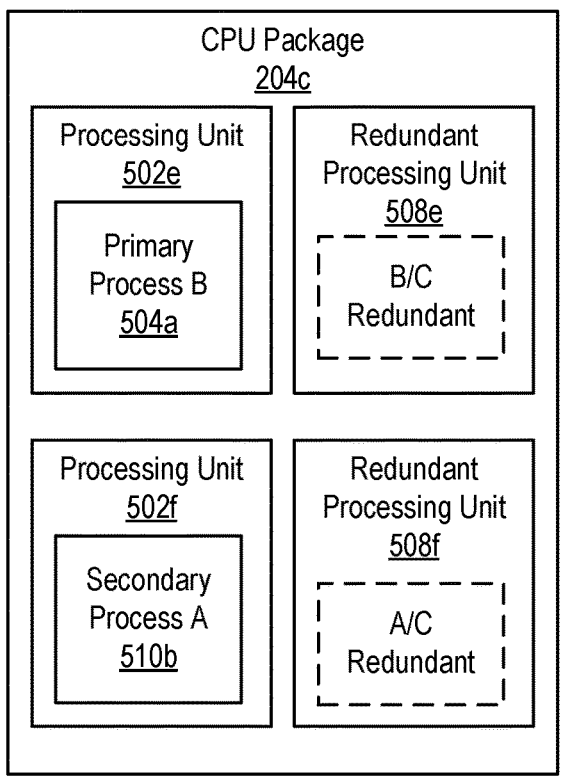

FIG. 5 is an example view of process allocation across CPU packages for automatically adjusting ergonomic features of a vehicle seat. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510b. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. The number of CPU packages, processing units, redundant processing units, and processes may be modified according to performance requirements while maintaining redundancy.

Figure 6:
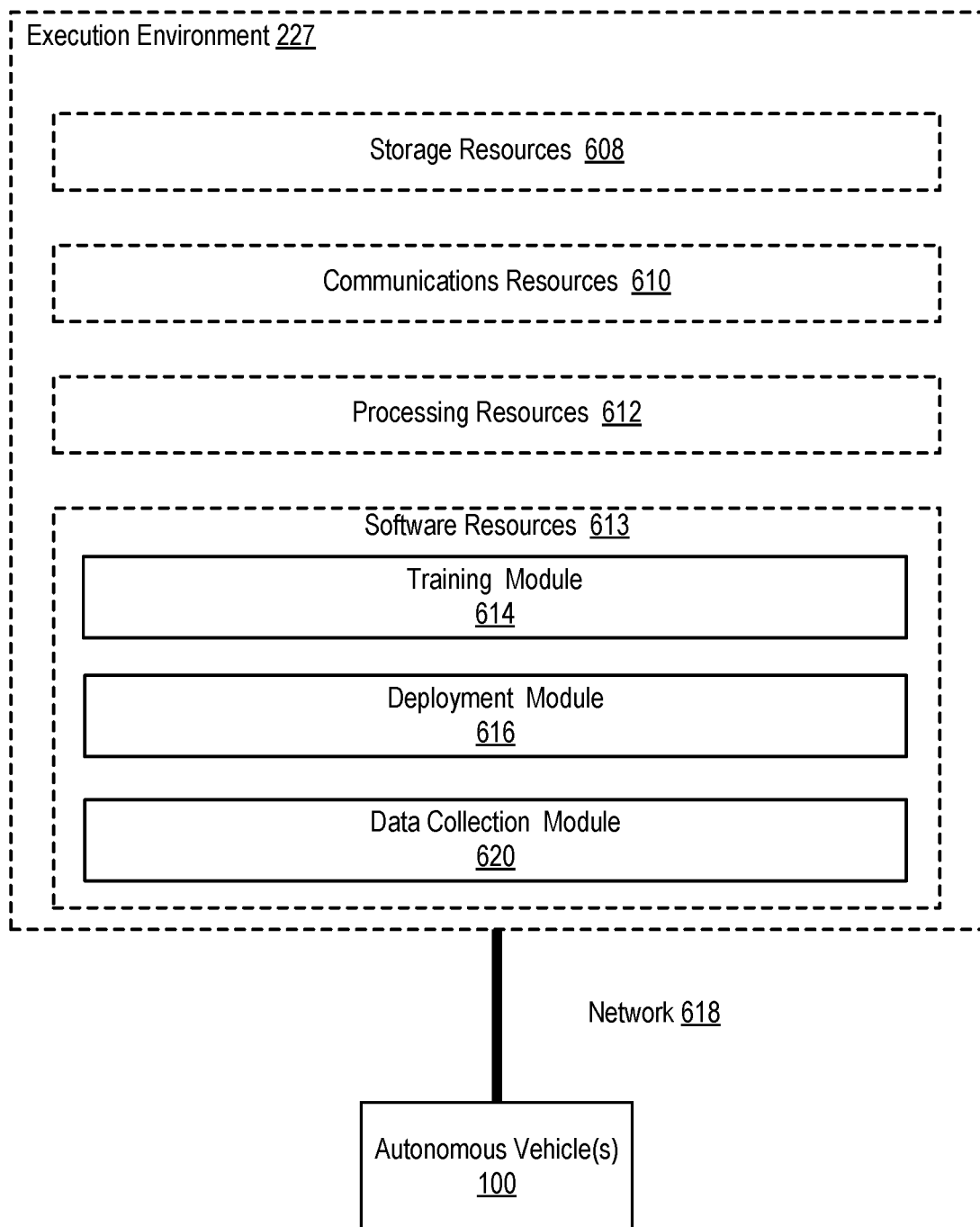
FIG. 6 is an example view of an execution environment for automatically adjusting ergonomic features of a vehicle seat according to some embodiments of the present disclosure.

For further explanation, FIG. 6 sets forth a diagram of an execution environment 227 in accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel (FC) technologies, FC over ethernet (FCoE) technologies, InfiniBand (IB) technologies, NVM Express (NVMe) technologies and NVMe over fabrics (NVMeoF) technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 612. The processing resources 612 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
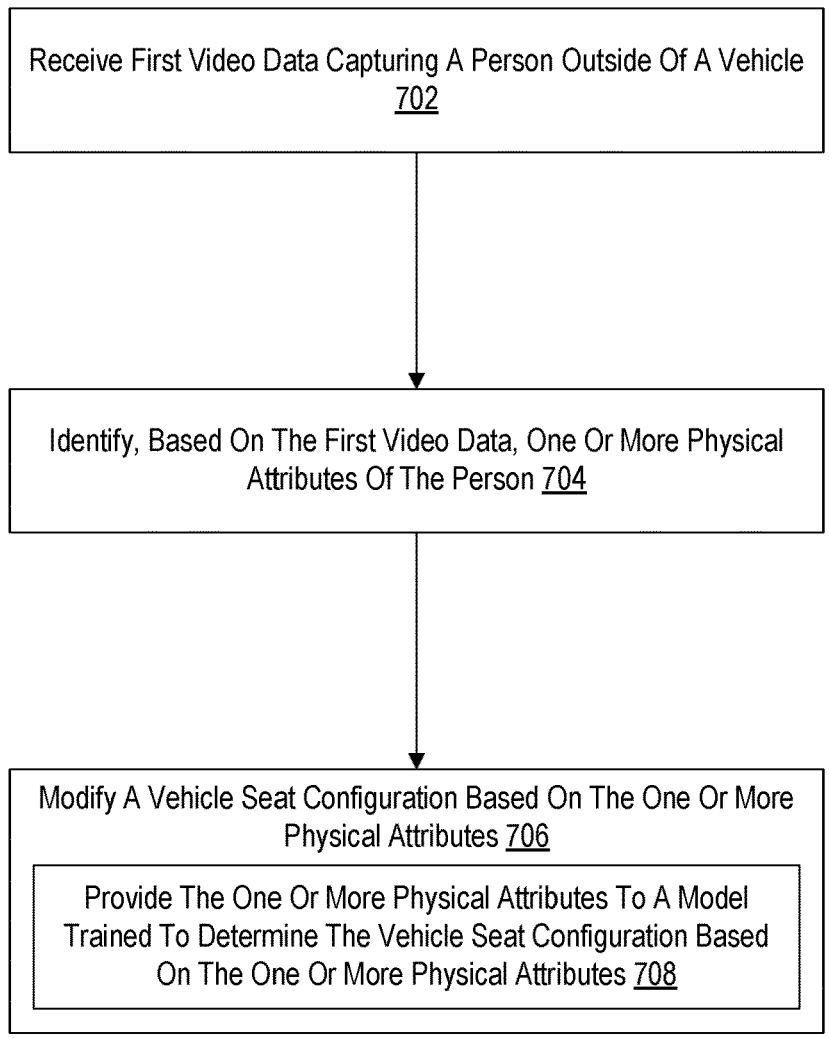
FIG. 7 is a flowchart of an example method for automatically adjusting ergonomic features of a vehicle seat according to some embodiments of the present disclosure.

For further explanation, FIG. 7 sets forth a flowchart of an example method for automatically adjusting ergonomic features of a vehicle seat according to some embodiments of the present disclosure. In some embodiments, the methods of FIG. 7-11 are performed in an autonomous vehicle 100. For example, in some embodiments, the methods of FIG. 7-11 are performed in an automation computing system 116 of an autonomous vehicle 100. In some embodiments, the methods of FIG. 7-11 are performed in a non-autonomous vehicle. That is, in some embodiments, the methods of FIG. 7-11 are performed in a vehicle without autonomous driving functionality, but with camera sensors, mechanical systems, and computing resources sufficient to perform the methods described in further detail below.

The method of FIG. 7 includes receiving 702 first video data capturing a first person outside of a vehicle. The vehicle may include, for example, an autonomous vehicle 100, a non-autonomous vehicle, or another vehicle. The first video data may be received by a computing system such as an automation computing system 116, a vehicle control system (VCS), or other computing system. The first video data may be received from one or more camera sensors facing outside of the vehicle.

Figure 12:
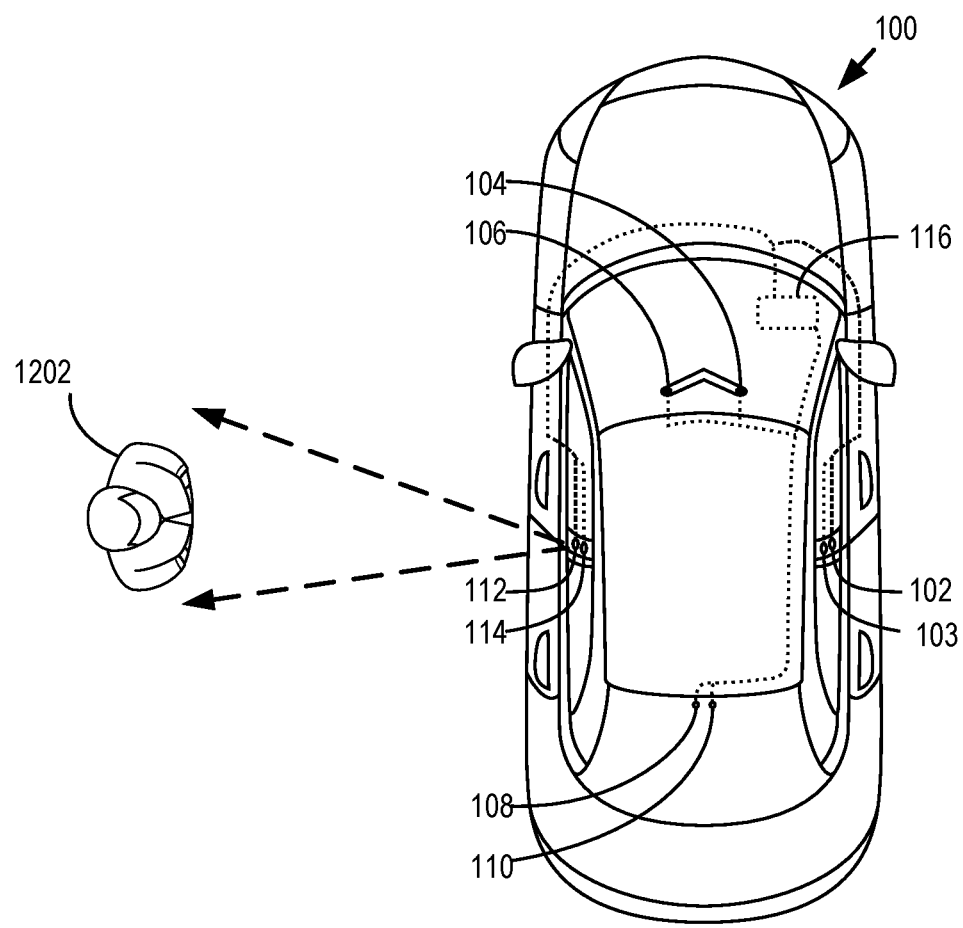
FIG. 12 is a diagram of an example use case for automatically adjusting ergonomic features of a vehicle seat according to some embodiments of the present disclosure.

Consider the example shown in FIG. 12, where a person 1202 is outside of an autonomous vehicle 100. The autonomous vehicle 100 includes camera sensors 102, 103, 104, 106, 108, 110, 114, and 114, referred to collectively as camera sensors 102-114, that provide video data to the automation computing system 116. Here, the person 1202 is captured by camera sensors 112 and 114 on the driver's side of the autonomous vehicle 100. Although this example shows the person 1202 captured by driver's side camera sensors 112,114, the first video data may be captured by a variety of camera sensors 102-114 and include first video data captured by such camera sensors 102-114. For example, in some embodiments, the first video data may include video data captured by camera sensors 102-114 as the person 1202 walks around the vehicle 100, approaches the vehicle 100 from a particular angle, or otherwise is within the field of view of any of the camera sensors 102-114.

The method of FIG. 7 also includes identifying 704, based on the first video data, one or more physical attributes of the person. The one or more physical attributes of a person may include one or more physical measurements. Such physical measurements may be measurements of particular body parts of the person, of the person as a whole, or measurements between particular reference points on the body. For example, the one or more physical attributes may include a height, a leg length, a torso length, an eye level, an arm length, a floor-to-waist measurement, a waist-to-shoulder measurement, a waist-to-crown measurement, and other measurements.

In some embodiments, the first video data may capture multiple persons. Accordingly, in some embodiments, identifying 704 the one or more physical attributes of the person may include identifying the person from multiple persons captured in the first video data. For example, in some embodiments, the person may be identified as an operator or as a person most likely to be an operator of the vehicle. Accordingly, in some embodiments, each person captured in the first video data may be evaluated based on their likelihood of being the operator of the vehicle. Such an evaluation may include a location or distance relative to the vehicle, an angle of approach to the vehicle, an estimated age based on facial analysis or other attributes, identifying a set of keys, a key fob, or other object in possession of the person, or by other approaches. In some embodiments, the first video data may be provided to a model trained to identify an operator or likely operator from multiple persons captured in video data.

Figure 13:
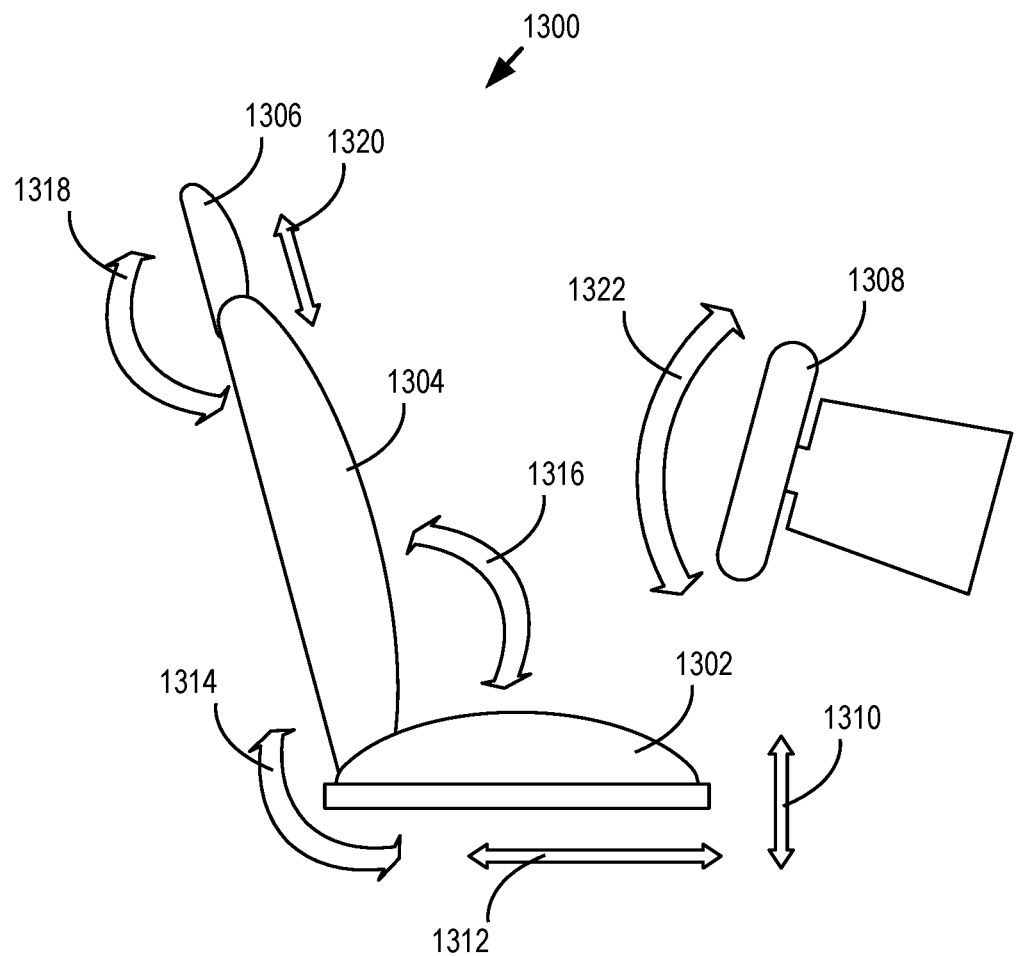
FIG. 13 is a diagram of an example vehicle seat for automatically adjusting ergonomic features of a vehicle seat according to some embodiments of the present disclosure.

The method of FIG. 7 also includes modifying 706 a vehicle seat configuration based on the one or more physical attributes. The modifying 706 a vehicle configuration may include modifying a placement or orientation of one or more components of a vehicle seat. For example, referring to the example vehicle seat 1300 of FIG. 13, modifying 706 a vehicle seat may include, for example, modifying a placement or orientation of a seat base 1302, a seat back 1304, or head rest 1306. Continuing with this example, in some embodiments, modifying 706 a vehicle seat may include modifying one or more of a seat height 1310 (e.g., a height of the vehicle seat 1300 relative to a floor or other surface), a seat depth 1312 (e.g., a distance of the vehicle seat 1300 from a steering wheel 1308 or dashboard), a seat angle 1314 (e.g., an angle of the seat base 1302), a seat back 1304 angle 1316 (e.g., an angle of the seat back 1304 relative to the seat base 1302), a head rest 1306 height 1318, or a head rest 1306 angle 1320. The various components of a vehicle seat that may be adjusted or repositioned may vary depending on the specific construction of the vehicle seat as well as mechanical systems capable of moving particular components. Accordingly, in some embodiments, additional, fewer, or different components may also be adjusted or modified when modifying 706 a vehicle seat configuration.

In some embodiments, modifying 706 a vehicle seat configuration includes modifying a positioning of one or more vehicle cabin components relative to an occupant of the vehicle seat. For example, in some embodiments, modifying 706 a vehicle seat configuration includes modifying a steering wheel 1308 angle 1322, a steering wheel depth, and the like. As another example, in some embodiments, modifying 706 a vehicle seat configuration includes modifying an angle or other positioning of one or more mirrors (e.g., rear mirror, driver's side mirror, passenger's side mirror, any combination of these).

Modifying 706 the vehicle seat configuration is based on the one or more physical attributes in that the one or more physical attributes identified in the video data are factors in determining a particular configuration for the vehicle seat. The vehicle seat configuration is then modified to conform to the determined configuration. In some embodiments, the one or more physical attributes are provided as inputs to one or more equations that calculate particular ergonomic features of the vehicle seat configuration (e.g., a height, angle, distance, and the like for different vehicle seat components or other components). For example, in some embodiments, multiple equations may be used to calculate particular features of the vehicle seat configuration, and the one or more physical attributes many be used to solve a series of equations to determine the particular ergonomic features of the vehicle seat configuration.

In some embodiments, modifying 706 the vehicle seat configuration includes providing 708 the one or more physical attributes to a model trained to determine the vehicle seat configuration based on the one or more physical attributes. The model may be trained to accept, as input, the one or more physical attributes. The model may be trained to output particular ergonomic features of the vehicle seat configuration (e.g., particular heights, angles, and distances for vehicle seat components), particular ranges for ergonomic features of the vehicle seat configuration, and the like.

As an example, a corpus of training data my include the physical attributes of particular operators as well as an operator-configured vehicle seat configuration (e.g., a vehicle seat configuration based on manual adjustment of the particular ergonomic features of the vehicle seat configuration). This training data may then be used to generate the trained model. In some embodiments, the training data may be specific to a particular vehicle or vehicle interior layout. Thus, the trained model may be specific to a particular vehicle model or a particular interior layout shared across multiple models. In some embodiments, the training data may correspond to multiple models with potentially multiple interior layouts. Accordingly, in some embodiments, the input to the trained model may include an identifier of a particular vehicle model or interior layout, data describing the position of various interior components (e.g., the seat, the steering wheel, mirrors, gear shifts, screens, and the like).

Modifying 706 the vehicle seat configuration includes activating one or more mechanical components (e.g., actuators or other mechanical components) to modify the vehicle seat configuration to conform to the determined vehicle seat configuration (e.g., the output of the equations or trained model used to determine the vehicle seat configuration).

Due to the differences in body shape and size of drivers or operators, a particular operator will have a different preferred vehicle seat configuration based on comfort, ergonomics, or other criteria. For example, taller operators may prefer more leg room or have mirrors positioned at a different eye level compared to shorter operators. As another example, operators with different torso or arm lengths may prefer a greater seat back angle compared to other operators. Typically, an operator is required to manually adjust each vehicle seat configuration feature until a desired configuration is reached. In contrast, the approaches set forth herein allow for an automatic configuration of the vehicle seat based on observed physical attributes, thereby reducing or eliminating the need for manual adjustment of vehicle seat configuration features.

Figure 8:
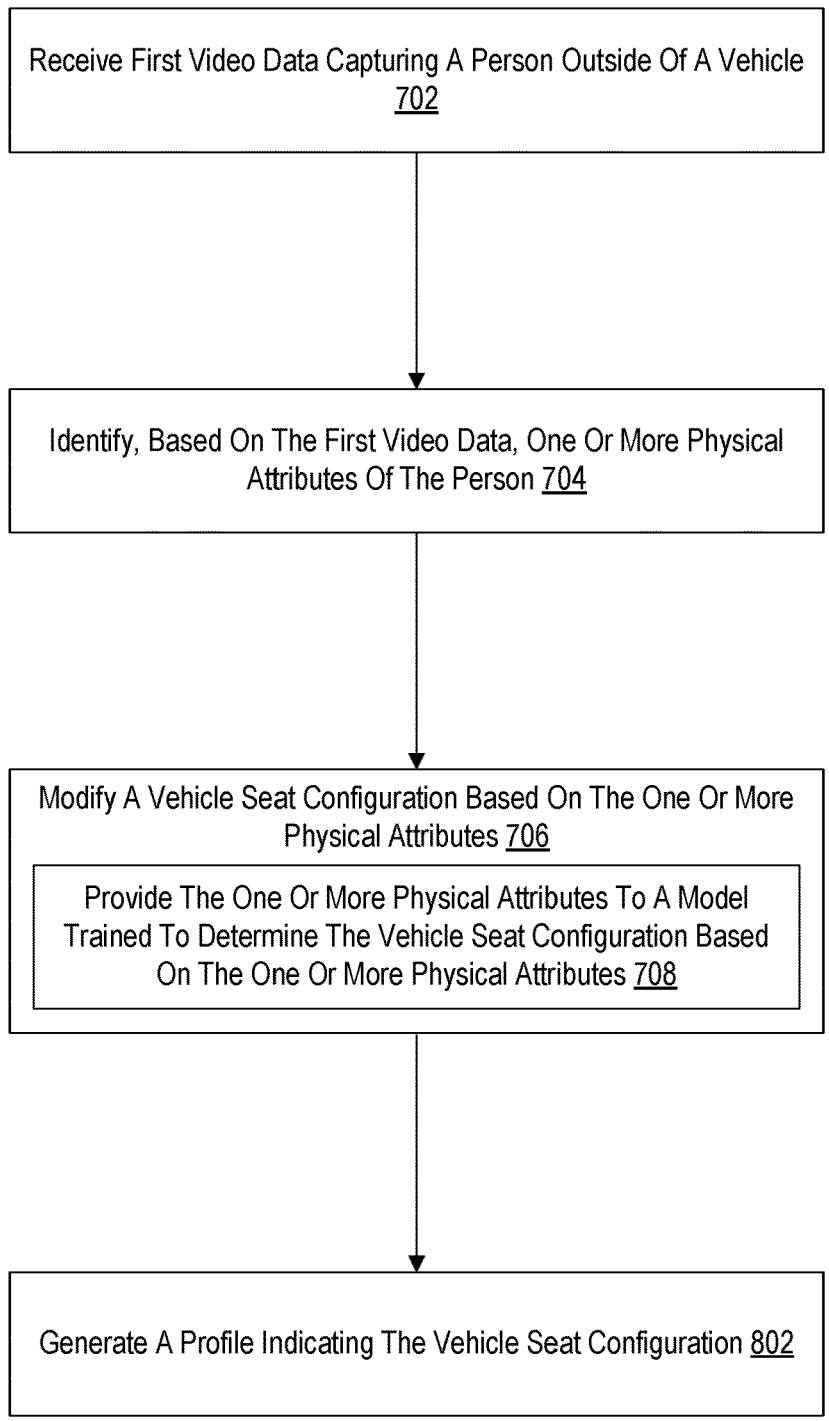
FIG. 8 is a flowchart of another example method for automatically adjusting ergonomic features of a vehicle seat according to some embodiments of the present disclosure.

For further explanation, FIG. 8 sets forth a flowchart of another example method for automatically adjusting ergonomic features of a vehicle seat according to some embodiments of the present disclosure. The method of FIG. 8 is similar to FIG. 7 in that the method of FIG. 8 also includes receiving 702 first video data capturing a person outside of a vehicle; identifying 704, based on the first video data, one or more physical attributes of the person; and modifying 706 a vehicle seat configuration based on the one or more physical attributes, including providing 708 the one or more physical attributes to a model trained to determine the vehicle seat configuration based on the one or more physical attributes.

The method of FIG. 8 differs from FIG. 7 in that the method of FIG. 8 also includes generating 802 a profile indicating the vehicle seat configuration. The profile may comprise data describing various vehicle seat configuration factors (e.g., the height, distance, angle, and the like of particular vehicle seat components). In other words, the profile may describe the vehicle seat configuration as determined by the physical attributes of a person. In some embodiments, the profile may comprise data that associates the profile with a particular user or operator. In some embodiments, the profile may also indicate the configuration of other components, such as mirror positioning.

For example, in some embodiments, the profile may include one or more physical identifiers for a person corresponding to the vehicle seat configuration. Such identifiers may include one or more images of a face of the person (e.g., as captured in the first video data or otherwise received). Such identifiers may also include data describing a gait or movement pattern of the person as extracted from the first video data or other video data. Such physical identifiers may facilitate later identification of the person through facial analysis, gait analysis, and the like as will be described in further detail below.

In some embodiments, the data associating the profile with a particular user or operator may include a device identifier. In some embodiments, the device identifier may include an identifier of a key fob or other device used to unlock or access the vehicle. In some embodiments, the device identifier may include an identifier of a mobile device such as a smartphone. For example, in some embodiments, generating 802 the profile may include transmitting or broadcasting a signal, such as when the person is detected via the camera sensors. The device identifier may then be received in response and included in the profile. As another example, in some embodiments, generating 802 the profile may include receiving the device identifier as part of a signal received from the device, such as a signal to unlock the vehicle, a signal attempting to pair the device with the vehicle, and the like. As a further example, in some embodiments, the device identifier may be manually entered. In some embodiments, the profile may be stored in a computing system of the vehicle. In other embodiments, as will be described in further detail below, the profile may be sent to another device for storage, such as a server or a mobile device.

Figure 9:
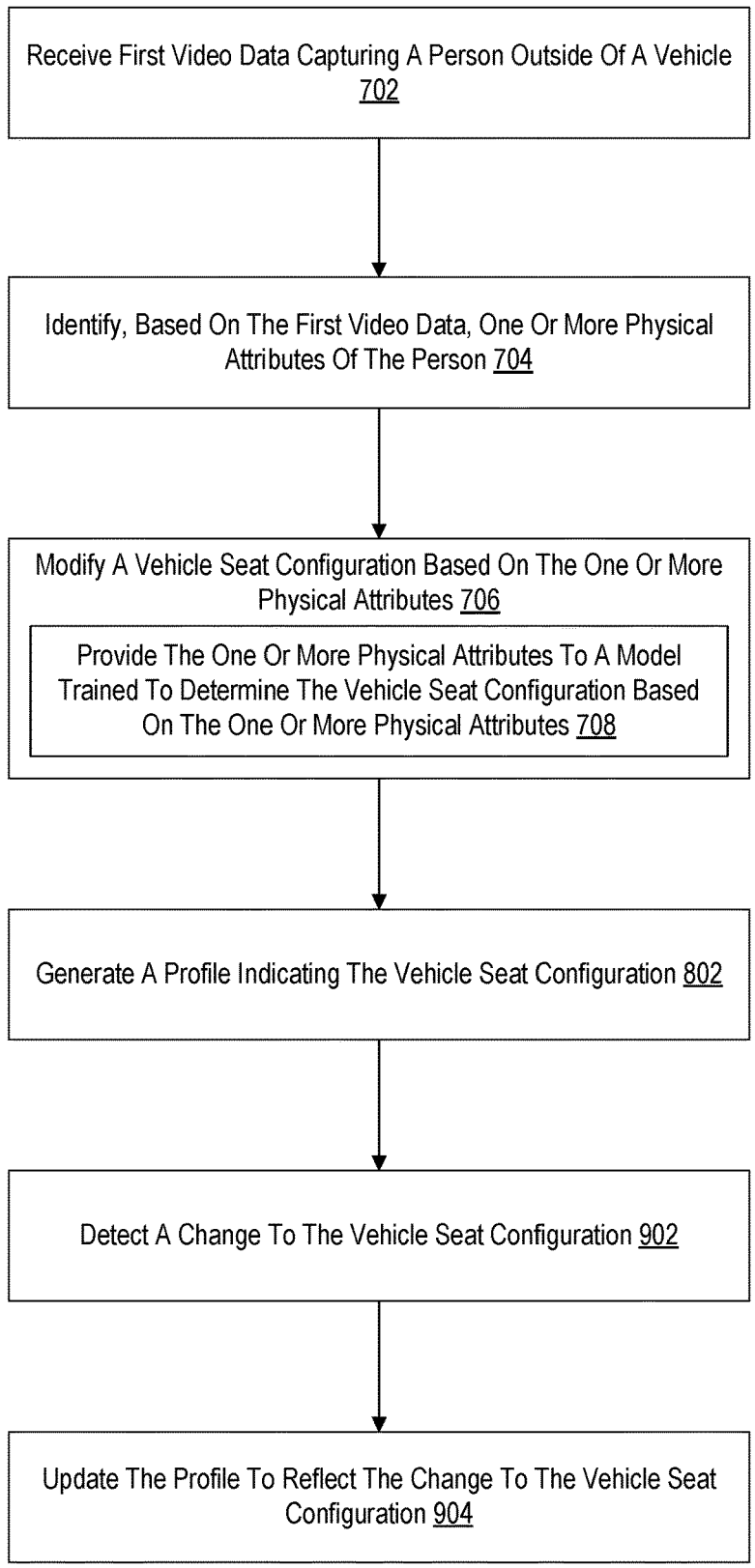
FIG. 9 is a flowchart of another example method for automatically adjusting ergonomic features of a vehicle seat according to some embodiments of the present disclosure.

For further explanation, FIG. 9 sets forth a flowchart of another example method for automatically adjusting ergonomic features of a vehicle seat according to some embodiments of the present disclosure. The method of FIG. 9 is similar to FIG. 8 in that the method of FIG. 9 also includes receiving 702 first video data capturing a person outside of a vehicle; identifying 704, based on the first video data, one or more physical attributes of the person; and modifying 706 a vehicle seat configuration based on the one or more physical attributes, including providing 708 the one or more physical attributes to a model trained to determine the vehicle seat configuration based on the one or more physical attributes; and generating 802 a profile indicating the vehicle seat configuration.

The method of FIG. 9 differs from FIG. 8 in that the method of FIG. 9 also includes detecting 902 a change to the vehicle seat configuration. Detecting 902 the change to the vehicle seat configuration includes detecting any change in the vehicle seat configuration performed via controls within the vehicle (e.g., by a seated operator). For example, vehicle seats include a variety of controls to allow for manual adjustment of the various vehicle seat components. Accordingly, detecting 902 the change to the vehicle seat configuration includes detecting 902 any manual adjustment of the vehicle seat components. Such adjustments are performed after the initial modification to the vehicle seat configuration described above.

The method of FIG. 9 also includes updating 904 to reflect the change to the vehicle seat configuration. For example, the profile may be modified to reflect the change to the vehicle seat configuration such that the profile reflects a current or most recent vehicle seat configuration. Thus, whereas the profile may initially describe a vehicle seat configuration that was automatically generated based on the detected physical attributes of an operator, the updated profile describes the vehicle seat configuration that includes manual adjustments based on operator preferences.

In some embodiments, one or more attributes of the vehicle seat configuration may be automatically adjusted during operation of the vehicle. As an example, in some embodiments, internal cameras may be used to track an eye positioning (e.g., level, angle, and the like) of an operator and adjust one or more mirrors based on the eye positioning. In some embodiments, where such adjustments are performed automatically during operation of the vehicle, the profile may or may not be modified to reflect these adjustments.

Figure 10:
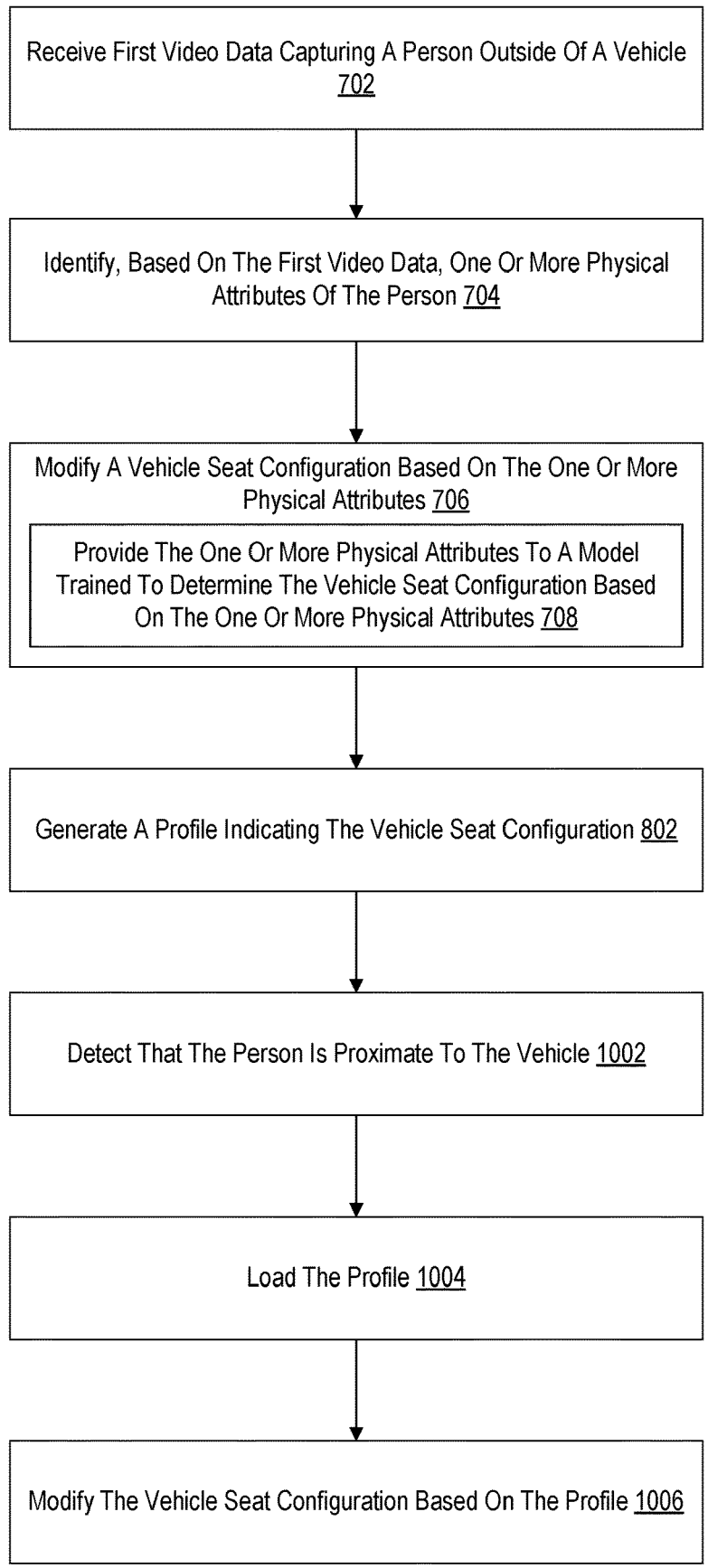
FIG. 10 is a flowchart of another example method for automatically adjusting ergonomic features of a vehicle seat according to some embodiments of the present disclosure.

For further explanation, FIG. 10 sets forth a flowchart of another example method for automatically adjusting ergonomic features of a vehicle seat according to some embodiments of the present disclosure. The method of FIG. 10 is similar to FIG. 8 in that the method of FIG. 10 also includes receiving 702 first video data capturing a person outside of a vehicle; identifying 704, based on the first video data, one or more physical attributes of the person; and modifying 706 a vehicle seat configuration based on the one or more physical attributes, including providing 708 the one or more physical attributes to a model trained to determine the vehicle seat configuration based on the one or more physical attributes; and generating 802 a profile indicating the vehicle seat configuration.

The method of FIG. 10 differs from FIG. 8 in that the method of FIG. 10 also includes detecting 1002 that the person (e.g., the person corresponding to the generated profile) is proximate to the vehicle. In some embodiments, detecting 1002 that the person is proximate to the vehicle is based on second video data (e.g., received from camera sensors of the vehicle) capturing the person. In some embodiments, facial analysis, gait analysis, or another analysis may be used to identify the person. For example, facial analysis data, gait analysis data, or other data may be generated and compared to one or more profiles. The person may be detected 1002 to be proximate to the vehicle based on a match to a particular profile corresponding to the person.

In some embodiments, detecting 1002 that the person is proximate to the vehicle may be based on a signal received from a device associated with the profile. For example, assume that the profile includes a particular device identifier. The person may be detected 1002 as being proximate to the vehicle in response to receiving a signal including the device identifier corresponding to the profile. The device may include, for example, a key fob, a mobile device, or another device. In some embodiments, the signal may be provided by the device in response to a request or query. For example, in some embodiments, a computing system of the vehicle may broadcast a query requesting device identifiers for proximate devices. In some embodiments, the device may send the signal include the device identifier in response to a user input to the device.

The method of FIG. 10 also includes loading 1004 the profile (e.g., in response to detecting 1002 that the person is proximate to the vehicle). For example, in some embodiments, the profile may be loaded 1004 from memory of the computing system of the vehicle. As another example, in some embodiments, loading 1004 the profile may include receiving the profile from a user device such as a mobile device. As a further example, in some embodiments, loading 1004 the profile may include loading 1003 the profile from a server or other remotely disposed computing device.

The method of FIG. 10 also includes modifying 1006 the vehicle seat configuration based on the profile. Modifying 1006 the vehicle seat configuration based on the profile includes modifying 1006 the vehicle seat configuration according to the particular configuration indicated in the profile. Thus, after establishing a profile for a particular person (e.g., a particular operator) using the physical attributes of the person and potentially subsequent modification by the person, the profile may be reused to restore a vehicle seat configuration without the initial computational burden and user input used to generate the initial profile.

Figure 11:
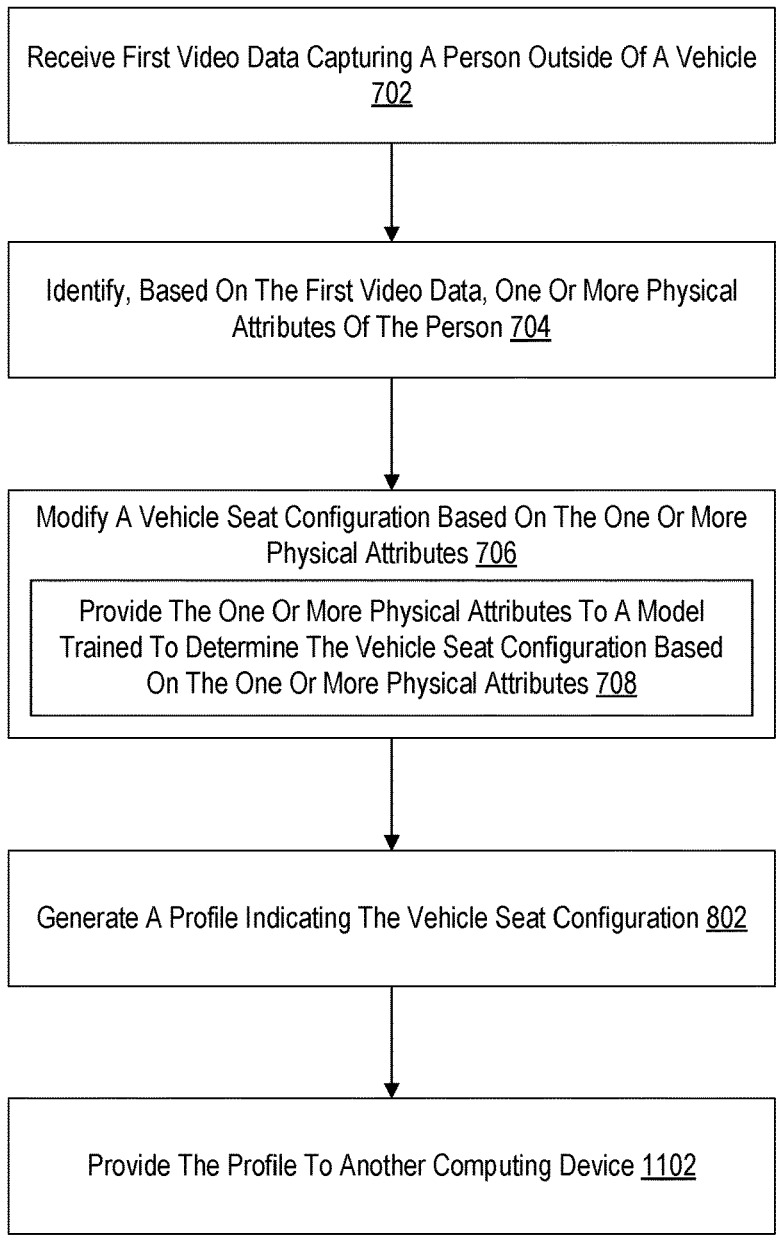
FIG. 11 is a flowchart of another example method for automatically adjusting ergonomic features of a vehicle seat according to some embodiments of the present disclosure.

For further explanation, FIG. 11 sets forth a flowchart of another example method for automatically adjusting ergonomic features of a vehicle seat according to some embodiments of the present disclosure. The method of FIG. 11 is similar to FIG. 8 in that the method of FIG. 11 also includes receiving 702 first video data capturing a person outside of a vehicle; identifying 704, based on the first video data, one or more physical attributes of the person; and modifying 706 a vehicle seat configuration based on the one or more physical attributes, including providing 708 the one or more physical attributes to a model trained to determine the vehicle seat configuration based on the one or more physical attributes; and generating 802 a profile indicating the vehicle seat configuration.

The method of FIG. 11 differs from FIG. 8 in that the method of FIG. 11 also includes providing 1102 the profile to another computing device. For example, the profile may be provided 1102 from the vehicle to another computing device via one or more wired networks, wireless networks, or other networks. In some embodiments, the other computing device may include a computing device proximate to the vehicle, such as a mobile device. For example, the profile may be provided 1102 to a mobile device paired with the vehicle or otherwise in communication with the vehicle. In some embodiments, the other computing device may include a server or other remotely disposed computing device.

Various actions may be performed using a profile provided 1102 to another computing device. For example, where the profile 1102 is provided to a mobile device, the profile may be loaded from the mobile device for reuse by the vehicle in modifying the vehicle seat configuration. The profile may also be loaded from the mobile device into other vehicles such that the vehicle seat configuration may be effectively transferred or reused across vehicles. As another example, where the profile is provided 1102 to a server, the server 1102 may subsequently provide the profile to other vehicles such that if the person operates another vehicle, that vehicle may use the profile in order to configure the vehicle seat.

As a further example, where the profile is provided 1102 to a server, the profile may be used to retrain models used to determine vehicle seat configurations based on physical attributes. For example, assume that the profile describes the physical attributes used to generate a vehicle seat configuration via a model. Further assume that the vehicle seat configuration was modified (e.g., via a manual modification). The modified configuration as described in the profile and the associated physical attributes may be used in a corpus of training data to retrain the model for better performance of the model.

Although the preceding discussion provided examples for automatically adjusting ergonomic features of a vehicle seat within the context of a driver's seat or operator seat, the approaches described herein may also be used to reconfigure the seats of persons other than the operator or driver.

In view of the explanations set forth above, the benefits of automatically adjusting ergonomic features of a vehicle seat according to embodiments of the present disclosure include:

Improved performance of a vehicle system by automatically configuring a vehicle seat based on observed physical attributes.

Improved performance of a vehicle system by allowing for modification and reuse of vehicle seat configuration profiles.

Exemplary embodiments of the present disclosure are described largely in the context of a fully functional computer system for automatically adjusting ergonomic features of a vehicle seat. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for automatically adjusting ergonomic features of a vehicle seat, comprising:
   receiving first video data capturing a plurality of persons outside of a vehicle;
   identifying, based on the first video data and independent of any non-video location information, a person from the plurality of persons most likely to be an operator of the vehicle independent of any previous identification of any of the plurality of persons;
   identifying, based on the first video data, one or more physical attributes of the person;
   determining, independent of any existing profile, a vehicle seat configuration by providing the one or more physical attributes to a trained model configured to provide, as output, the vehicle seat configuration; and
   actuating one or more mechanical components to conform a seat of the vehicle to conform to the vehicle seat configuration.

2. A method for automatically adjusting ergonomic features of a vehicle seat, comprising:
   receiving first video data capturing a plurality of persons outside of a vehicle;
   identifying, based on the first video data and independent of any non-video location information, a person from the plurality of persons most likely to be an operator of the vehicle independent of any previous identification of any of the plurality of persons;
   identifying, based on the first video data and independent of any existing profile, one or more physical attributes of the person;
   modifying a vehicle seat configuration based on the one or more physical attributes;
   generating a profile indicating the vehicle seat configuration;
   detecting a change to the vehicle seat configuration comprising a manual actuation of a mechanical component of the one or more mechanical components via one or more controls included in the vehicle; and
   updating the profile to reflect the manual change to the vehicle seat configuration.

3. The method of claim 2, wherein modifying the vehicle seat configuration comprises evaluating the one or more physical attributes with a model trained to determine the vehicle seat configuration based on the one or more physical attributes.

4. The method of claim 2, further comprising:
   detecting that the person is proximate to the vehicle;
   loading the profile; and
   modifying the vehicle seat configuration based on the profile.

5. The method of claim 4, wherein detecting that the person is proximate to the vehicle comprises identifying the person in second video data capturing the person.

6. The method of claim 5, wherein identifying the person in the second video data is based on one or more of a facial analysis or a gait analysis.

7. The method of claim 4, wherein detecting that the person is proximate to the vehicle comprises receiving a signal from a device associated with the profile.

8. The method of claim 2, further comprising providing the profile to another computing device.

9. The method of claim 2, wherein the person comprises an operator of the vehicle, and the method further comprises:
   receiving second video data capturing the operator inside the vehicle; and
   modifying an orientation of one or more mirrors based on the second video data.

10. The method of claim 9, wherein modifying the orientation of the one or more mirrors is based on one or more of an eye level of the operator or a gaze of the operator identified in the second video data.

11. The method of claim 9, wherein modifying the orientation of the one or more mirrors is performed in response to a threshold time duration since a previous modification of the orientation has passed.

12. The method of claim 1, further comprising:
   detecting that the person is proximate to the vehicle;
   loading a profile; and
   modifying the vehicle seat configuration based on the profile.

13. The method of claim 12, wherein detecting that the person is proximate to the vehicle comprises identifying the person in second video data capturing the person.

14. The method of claim 13, wherein identifying the person in the second video data is based on one or more of a facial analysis or a gait analysis.

15. The method of claim 12, wherein detecting that the person is proximate to the vehicle comprises detecting that a device associated with the profile is proximate to the vehicle.

16. The method of claim 1, wherein identifying the person most likely to be an operator is based on a distance of each of the plurality of persons to the vehicle.

17. The method of claim 1, wherein identifying the person most likely to be an operator is based on an angle of approach to the vehicle for each of the plurality of persons.

18. The method of claim 1, wherein identifying the person most likely to be an operator is based on an estimated age of each of the plurality of persons.

19. The method of claim 1, wherein identifying the person most likely to be an operator is based on identifying, in the video data, an object in possession of the person.

20. The method of claim 19, wherein the object comprises a key fob.

* * * * *